United States Patent
Madonna et al.

(10) Patent No.: US 11,936,492 B2
(45) Date of Patent: Mar. 19, 2024

(54) REDUNDANT CONTROL FOR WIRELESS DEVICES IN A HOME AUTOMATION SYSTEM

(71) Applicant: Savant Systems, Inc., Hyannis, MA (US)

(72) Inventors: Robert P. Madonna, Osterville, MA (US); Kevin C. Kicklighter, Cottonwood, UT (US); Swapnil Bora, Dallas, TX (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 17/018,015

(22) Filed: Sep. 11, 2020

(65) Prior Publication Data
US 2021/0075637 A1 Mar. 11, 2021

Related U.S. Application Data

(60) Provisional application No. 62/899,004, filed on Sep. 11, 2019.

(51) Int. Cl.
*H04L 12/28* (2006.01)
*H04W 4/80* (2018.01)
(Continued)

(52) U.S. Cl.
CPC ........ *H04L 12/2832* (2013.01); *H04L 12/282* (2013.01); *H04L 2012/2841* (2013.01)

(58) Field of Classification Search
CPC .............. H04L 12/2832; H04L 12/282; H04L 2012/2841
See application file for complete search history.

(56) References Cited

U.S. PATENT DOCUMENTS 7,826,408 B1 11/2010 Vleugels et al.
8,190,275 B2 5/2012 Chang
(Continued)

FOREIGN PATENT DOCUMENTS

WO WO-2015001041 A1 1/2015

OTHER PUBLICATIONS

"Notification of Transmittal of the International Search Report and the Written Opinion of the International Searching Authority, or the Declaration," International Filing Date: Sep. 11, 2020, International Application No. PCT/US2020/050304, Applicant: Savant Systems, Inc., dated Dec. 16, 2020, pp. 1-14.

*Primary Examiner* — John A Follansbee
*Assistant Examiner* — Kamal M Hossain
(74) *Attorney, Agent, or Firm* — Cesari and McKenna, LLP; James A. Blanchette

(57) ABSTRACT

In one embodiment, an architecture for redundant control of wireless devices (e.g., wireless light fixtures, wireless light strips, wireless window shades, or other wireless devices) of a home automation system is provided that uses a combination of WLAN and WPAN communication. During normal operation of the home automation system, control commands generated in response to user input in a control application (app) on a control device (e.g., a remote control, mobile device, or other electronic device) are transmitted via a WLAN (e.g., Wi-Fi) to a bridge device (e.g., a lamp module or wireless keypad) proximate to the wireless device, which forwards the commands over a WPAN (e.g., BLE) to the wireless device. In the absence of an available WLAN connection (e.g., due to failure, prior to its configuration, etc.), the control device may send control commands via the WPAN (e.g., BLE) directly to the wireless device.

14 Claims, 3 Drawing Sheets

(51) Int. Cl.
*H04W 24/04* (2009.01)
*H04W 84/12* (2009.01)
*H04W 84/20* (2009.01)

(56) References Cited

U.S. PATENT DOCUMENTS

| | | | |
|---|---|---|---|
| 8,649,386 B2 | 2/2014 | Ansari et al. | |
| 8,724,639 B2 | 5/2014 | Mahmoud | |
| 9,019,083 B2 | 4/2015 | Corsini et al. | |
| 9,191,230 B2 | 11/2015 | Madonna et al. | |
| 9,800,429 B2 | 10/2017 | Crayford et al. | |
| 9,806,900 B2 | 10/2017 | Jacobson et al. | |
| 10,594,990 B1* | 3/2020 | Lemberger | H04W 48/18 |
| 2014/0244063 A1 | 8/2014 | Davis et al. | |
| 2014/0273867 A1* | 9/2014 | Lamb | H04M 1/72415 |
| | | | 455/67.11 |
| 2015/0120000 A1* | 4/2015 | Coffey | H04W 12/50 |
| | | | 315/86 |
| 2015/0195100 A1* | 7/2015 | Imes | G05B 15/02 |
| | | | 455/420 |
| 2015/0256665 A1 | 9/2015 | Pera et al. | |
| 2016/0044447 A1 | 2/2016 | Tetreault et al. | |
| 2016/0209899 A1 | 7/2016 | Brantner et al. | |
| 2016/0218884 A1 | 7/2016 | Ebrom et al. | |
| 2017/0097619 A1* | 4/2017 | Welingkar | H04L 67/125 |
| 2017/0099157 A1* | 4/2017 | Jacobson | H04L 12/2814 |
| 2018/0084419 A1 | 3/2018 | Sun et al. | |
| 2018/0191517 A1* | 7/2018 | Emigh | G06F 3/04847 |
| 2020/0068627 A1* | 2/2020 | Zhang | H05B 47/11 |
| 2020/0322177 A1* | 10/2020 | Kim | F24F 11/62 |
| 2021/0057113 A1* | 2/2021 | Ni | H04L 67/12 |

* cited by examiner

REDUNDANT CONTROL FOR WIRELESS DEVICES IN A HOME AUTOMATION SYSTEM

RELATED APPLICATIONS

The present application claims the benefit of U.S. Provisional Patent Application. No. 62/899,004, filed on Sep. 11, 2019 by Robert P. Madonna et al., for an "Redundant Control for Wireless Devices in a Home Automation System", the contents of which are incorporated by reference herein in their entirety.

BACKGROUND

Technical Field

The present disclosure relates generally to device control and more specifically to an architecture for redundant control of wireless devices of a home automation system.

Background Information

As homes and other structures become larger, and become filled with more devices device control becomes an increasing challenge. Home automation systems are becoming increasingly popular to manage these complexities. Traditionally, home automation systems have relied mainly on wired connections (e.g., Ethernet, RS-232, DMX/RS485, etc.) to communicate between controllers and devices subject to control (e.g., lighting devices, electric window shades, electronic door locks, etc.). Such wired connections were highly reliable, but posed significant installation challenges, especially when installing a home automation system in an existing structure. Installers would typically need to fish wires through walls between each of the devices and controllers. This task required significant time, effort and expense.

To address the installation challenges of using wired connections, a variety of types of wireless communication have been tried with devices of home automation systems. Some devices have been configured with wireless local area network (WLAN) interfaces (e.g., Wi-Fi interfaces) and join an in-home WLAN provided by one or more access points (APs) (e.g., Wi-Fi APs). Other devices have been configured with wireless personal area network (WPAN) adaptors (e.g., Bluetooth Low Energy (BLE) adaptors) and configured to communicate via a short-distance WPAN. While usable, each approach has had shortcomings.

WLAN communication may be unreliable due to AP failure, low signal strength and other issues. When the WLAN is not available, a user may be unable to change the state of the devices controlled by the home automation system, for example, to illuminate lighting devices, open electric window shades to let in natural light, unlock doors with electric door locks, etc. This may not only be inconvenient, but also may hinder the user's ability to address the failure in the WLAN communication (e.g., reboot the AP) and restore functionality. Further, use of WLAN communication may complicate install of home automation devices. A functioning WLAN needs to be operating in the structure that can be used for initial configuration of the devices. This may not be convenient for certain project workflows. For example, in new construction, it may be inconvenient to setup a functioning WLAN before lighting devices are installed. Still further, use of WLAN communication imposes limitations on use of battery power for devices. A WLAN adaptor (e.g., a Wi-Fi adaptor) may consume significant power resources. Such demands may be difficult to meet with battery powered devices.

Further, WPAN communication may present its own issues. Most WPAN protocols have a short operating range under real-world conditions (e.g., 10 or less meter for BLE) and poorly penetrate obstructions (e.g., walls) in a structure. As such, when a WPAN is used between a control device and a wireless device of the home automation system, the control device typically must be quite close. With a WPAN alone, a user may be unable to control a wireless device from a remote room of the structure or from outside the structure.

While a number of architectures have attempted to address these issues, many such architectures have added undesirable complexity and unit cost. Since a home automation system may include a large number of wireless devices, minimizing complexity and unit cost may be very important.

Accordingly, there is a need for an improved architecture for control of wireless devices of a home automation system. The architecture preferably would provide long range operation during routine use, while also providing high reliability and flexibility during initial installation. It would be further desirable if such an architecture did not add significant complexity and unit cost.

SUMMARY

In one embodiment, an architecture for redundant control of wireless devices (e.g., wireless light fixtures, wireless light strips, wireless window shades, or other wireless devices) of a home automation system is provided that uses a combination of WLAN and WPAN communication. During normal operation of the home automation system, control commands generated in response to user input in a control application (app) on a control device (e.g., a remote control, mobile device, or other electronic device) are transmitted via a WLAN (e.g., Wi-Fi) to a bridge device (e.g., a lamp module or wireless keypad) proximate to the wireless device, which forwards the commands over a WPAN (e.g., BLE) to the wireless device. In the absence of an available WLAN connection (e.g., due to failure, prior to its configuration, etc.), the control device may send control commands via the WPAN (e.g., BLE) directly to the wireless device.

During routine operation, the long range of WLAN communication (e.g., Wi-Fi) may be achieved, in the absence of an available WLAN the device can still be controlled using a WPAN by bringing the control device nearby. Complexity and cost of the wireless device may be minimized as redundant hardware is not required therein (e.g., the device does not need both a WLAN interface and a WPAN adaptor). Further, since the bridge device may provide other useful home automation functions independent of bridging (e.g., a lamp module may provide a lighting device control function, a keypad may provide a user interface function, etc. independent of bridging functions), the incremental cost of providing bridging may be defrayed. The technique may be well suited for battery-powered wireless devices, given the low power requirements of WPAN (e.g., BLE) communication (e.g., in comparison to Wi-Fi).

It should be understood that a variety of additional features and alternative embodiments may be implemented. This Summary is intended simply as a brief introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which.

DETAILED DESCRIPTION

Definitions

As used herein, the term "home automation system" should be interpreted broadly to encompass various types of home control, "smart home", and/or device control systems that may control devices (e.g., lighting devices, display devices, electric window shades, HVAC devices, and/or other types of devices) within a structure, such as a residential dwelling or commercial building.

As used herein, the term "mobile device" refers to an electronic device that executes a general-purpose operating system and is adapted to be transported on one's person. Devices such as smartphones should be considered mobile devices. Desktop computers, servers, or other primarily-stationary computing devices generally should not be considered mobile devices.

As used herein, the term "bridge device" refers to a device of a home automation system that includes multiple wireless interfaces/adaptors that utilize different wireless communication protocols and that is capable of receiving control commands via one wireless communication protocol (e.g., Wi-Fi) and forwarding the control commands via another wireless communication protocol (e.g., BLE).

As used herein, the term "proximate" refers to the property of being within the operational range of a WPAN adaptor of another device. A device that is within the operational range of the WPAN adaptor of a second device is considered proximate to the second device. A device that is not within the operational range of the WPAN adaptor of a second device is considered not to be proximate to the second device.

An Example Home Automation System Architecture

Figure 1:
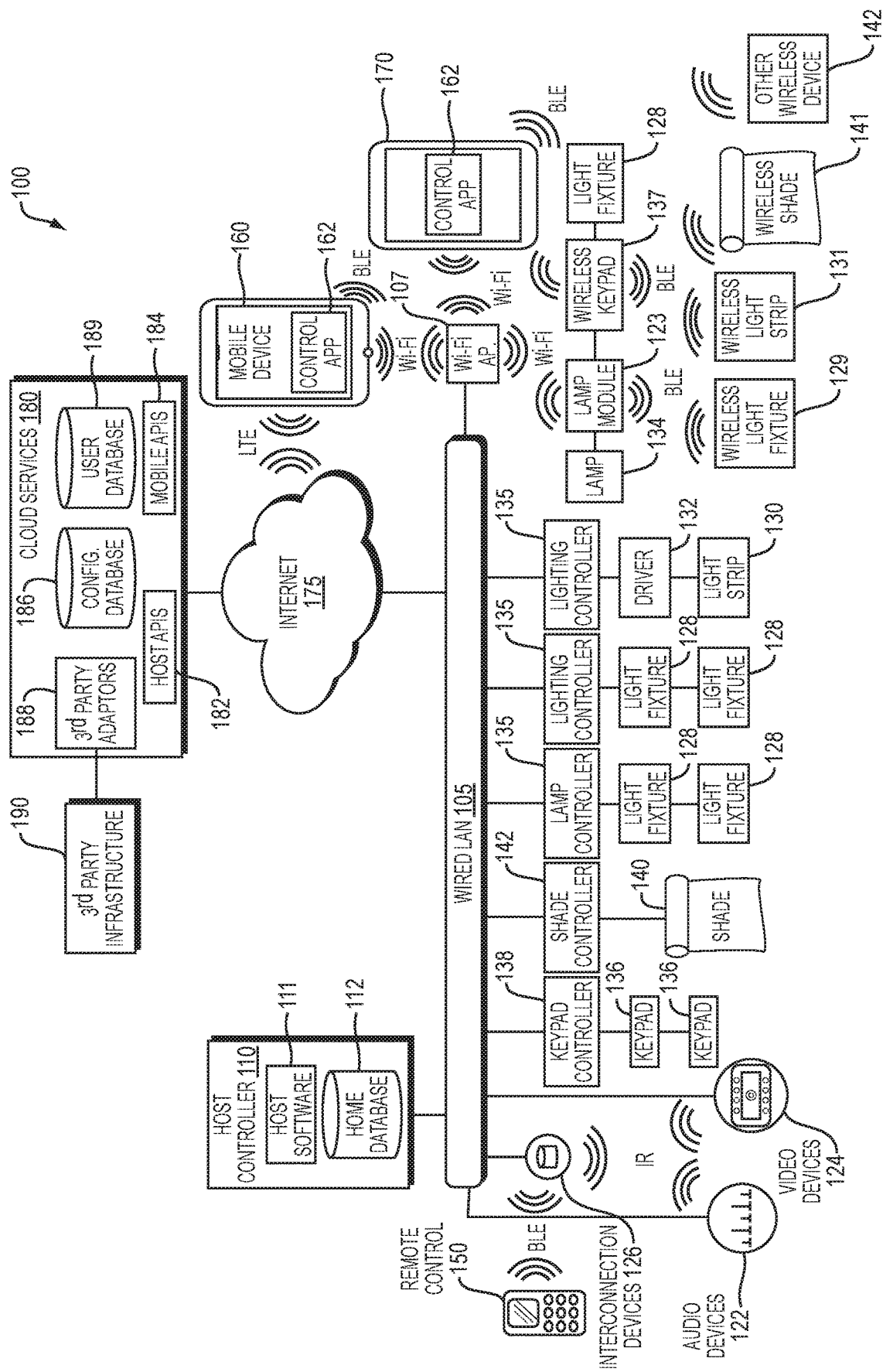
FIG. 1 is a block diagram of an example architecture of a home automation system which may feature redundant control of at least some wireless devices.

FIG. 1 is a block diagram of an example architecture 100 of a home automation system which may feature redundant control of at least some wireless devices. At the core of the system is a host controller 110 coupled to an in-home wired local area network (LAN) 105, for example, an Ethernet LAN, which is in turn coupled to an AP 107, for example, a Wi-Fi AP, that provides an in-home WLAN.

The host controller 110 may include hardware components such as a processor, a memory and a storage device, which collectively store and execute host software 111 configured to monitor and control the operations of devices 120-142; provide UI interpretation, system administration and monitoring; perform synchronization with cloud services 180; provide activity recording services; provide activity prediction services; and/or provide other types of functionality. The host controller 110 may also maintain in its storage device a home database 112 that stores configuration information including information regarding devices 120-142 controlled by the home automation system, and services the devices are able to provide, as well as information about remote controls 140, mobile devices 160, and other electronic devices 170 that provide a graphical user interface (GUI) for controlling the devices 120-142.

The devices 120-142 controlled by the home automation system may take a number of different forms. The devices 120-142 may include audio devices 122 and video devices 124 (collectively A/V devices), such as display devices (e.g., televisions, monitors, etc.), A/V device controllers, media servers, audio amplifiers, cable boxes, and the like that receive control commands via a wired connection (e.g., an Ethernet link) with the wired LAN 105, via an interconnection device 126 (such as an infrared (IR) blaster) or other type of wired or wireless link. The devices 120-142 may also include lighting devices, such as wired light fixtures 128 and controllers 135 (e.g., light emitting diode (LED) fixtures coupled to controllers with wired connections for control); wireless light fixtures 129 (e.g., LED fixtures with wireless connections for control); wireless light strips 130 and drivers 132 (e.g., LED strips coupled to drivers with a wired connection for control); wireless light strips 131 (e.g., LED light strips with wireless connections for control); wireless lamp modules 133 (i.e., modules that are coupled to an illumination source, such as a lamp 134, via an electrical cord (e.g., a household 120/240v electrical cord) and regulate power flow to the one or more attached illumination sources in response to control commands received via wireless connections); and the like.

As indicated above, some lighting devices (e.g., lighting controllers 135) may receive commands and provide control signals via wired connections. For example, lighting controllers 135 may receive commands via an Ethernet link to the wired LAN 105 and provide control signals to individual lighting fixtures 128 and light strips 130 via one or more other wired connections (e.g., DMX/RS-485, 2-wire 0-10v wiring, etc.). Other lighting devices may receive control commands via wireless connections, either to the WLAN (e.g., Wi-Fi) or a WPAN (e.g., BLE). For example, lamp modules 133 may receive control commands via a wireless connection to the WLAN (e.g., Wi-Fi) 105. Likewise, still other lighting devices may receive control commands via a WPAN (e.g., BLE). For example, wireless light fixtures 129 and wireless light strips 131 may receive control commands via a WPAN (e.g., BLE). At least some lighting devices (e.g., lamp modules 133) may provide a bridging function in addition to an illumination function, for example, receiving commands via the WLAN (e.g., Wi-Fi) and forwarding the commands over the WPAN (e.g., BLE) to a wireless device.

The devices 120-142 may also include interface devices, such as keypads 136, keypad controllers 138 and wireless keypads. Some interface devices (e.g. keypads 136) receive user input requesting state changes and provide control commands via wired connections (e.g., RS-485) to other interface devices (e.g., keypad controllers 138) which translate and forward the control commands over other wired connections (e.g., LAN 105). Other interface devices may receive user input requesting state changes and provide control commands via wireless connections, such as a WLAN (e.g., Wi-Fi). For example, wireless keypad 137 may provide control commands via a wireless connection to the WLAN (e.g., Wi-Fi) 105. In some cases, interface devices may be directly coupled to and regulate power flow to the one or more attached illumination sources, such as a light fixture 128, in response to user input requesting state changes. For example, a wireless keypad 137 may be coupled to (e.g., via household 120/240v wiring) and regulate power flow to more light fixtures 128. At least some interface devices (e.g., wireless keypad 137) may provide a bridging function in addition to a user interface function (and potentially lighting device control function), for example, receiving commands via the WLAN (e.g., Wi-Fi) and forwarding the commands over the WPAN (e.g., BLE) to a wireless device.

The devices 120-142 may also include motor and/or relay operated devices. Some motor and/or relay operated devices (e.g., shade controller 142) may receive commands and provide control signals via wired connections. For example, a shade controller 142 may receive commands via an Ethernet link to the wired LAN 105 and interface with individual window shades 140 via other wired connections (e.g., RS-485). Other motor and/or relay operated devices may receive control commands via wireless connections, for example via a WPAN (e.g., BLE). For example, wireless shades 141 may receive control commands via a wireless connection to a WPAN (e.g., BLE). These WPAN signals may be provided by a bridge device (e.g., a lamp module 133 or wireless keypad 137) proximate the device that receives commands via the WLAN (e.g., Wi-Fi) and forwards the commands over the WPAN to the device.

It should be understood that in addition to the WPAN (BLE) wireless lighting devices (e.g., wireless light fixtures 129, and wireless light strip 131) and wireless motor and/or relay operated devices (e.g., wireless window shades 141) shown in FIG. 1, a variety of other types of wireless devices (e.g., security devices, heating ventilation and cooling (HVAC) devices, interface devices, electronic door locks, etc.) may receive control commands via a WPAN (e.g., BLE).

A user may control the devices 120-142 of the home automation system 100 using a remote control 150. The remote control 150 may include a touch sensitive display screen, physical buttons, a WLAN interface (e.g., a Wi-Fi interface), a WPAN adaptor (e.g., a BLE adaptor), a processor, a memory and a storage device that stores and executes a control app configured to interface with the host controller 110 and cloud services 180. The control app on the remote control 150 may present a user interface with screens for triggering control commands for controlling the devices 120-142 of the home automation system 100, among other functionality.

A user may also control the devices 120-142 of the home automation system 100 using a mobile device 160. The mobile device 160 may include a touch sensitive display screen, a WLAN interface (e.g., a Wi-Fi interface), a WPAN adaptor (e.g., a BLE adaptor), a processor, a memory and a storage device that stores and executes a control app 162 configured to interface with the host controller 110 and/or cloud services 180. The control app on the mobile device 160 may present a user interface with screens for triggering control commands for controlling the devices 120-142 of the home automation system 100, among other functionality.

Still further, a user may control the devices 120-142 of the home automation system 100 using a tablet computer, a dedicated touch screen unit, or other electronic device 170. The electronic device 170 may include a display screen (e.g., touch sensitive, non-touch sensitive, etc.), an input device, a WLAN interface (e.g., a Wi-Fi interface), a WPAN adaptor (e.g., a BLE adaptor), a processor, a memory and a storage device that stores and executes a control app 162 configured to interface with the host controller 110 and/or cloud services 180. The control app on the electronic device 170 may present a user interface with screens for triggering control commands for controlling the devices 120-142 of the home automation system 100, among other functionality.

Some devices (e.g., a host controller 110, a mobile device 160, other electronic device 170, etc.) may communicate via the Internet 175 with cloud services 180 and its host application program interfaces (APIs) 182 and mobile APIs 184. The cloud services 180 may provide remote access to home automation control; a persistent backup of the home database 130, for example, storing data in a configuration database 186; interfaces to third party infrastructure, for example, via third party adaptors 188; user profiles and usage tracking, for example, storing data in user database 189; a mechanism for over-the-air updates; host crash reporting; license management; as well as a variety of other functionality.

Figure 2:
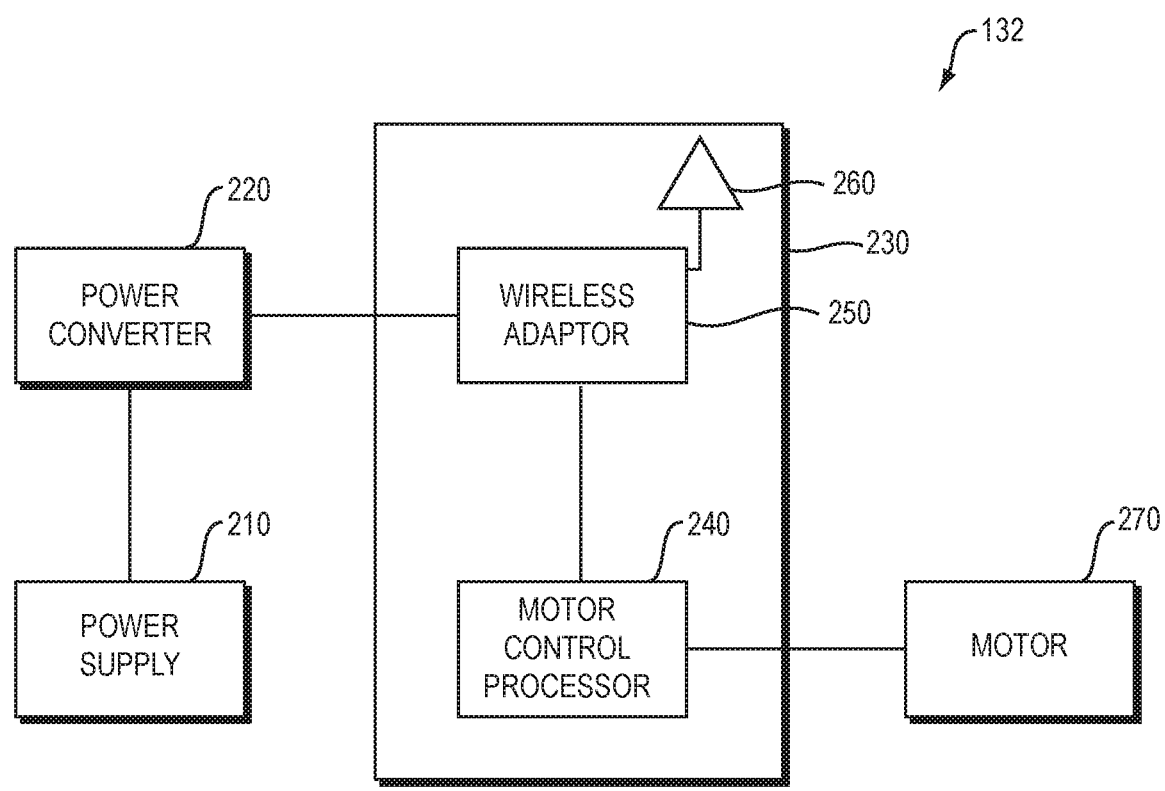
FIG. 2 is a block diagram of an example wireless window shade that may receive control commands via a wireless connection to a WPAN (e.g., BLE)

FIG. 2 is a block diagram of a wireless window shade 141 that may receive control commands via a wireless connection to a WPAN (e.g., BLE). The wireless window shade 141 utilizes a power supply 210 (e.g., an AC/DC power supply) that may be external or internal, and a power converter 220 that converts the power to an appropriate voltage and current. Power is supplied to a controller board 230 that includes a motor control processor 240 and a wireless adaptor 250 coupled to an antenna 260. The wireless adaptor 250 may include a WPAN (e.g., BLE) processor that takes control commands received via the antenna 260 and passes them via parallel or serial communication (e.g., I2C, SPI, UART, etc.) to the motor control processor 240, which converts them with a conversion mechanism to signals to drive a motor 270 attached to a shade assembly (not shown) and rotate the motor in a specific direction, with a specific speed, for a specific duration to raise or lower the shade. The motor 270 may be a digital motor or other type of controllable motor.

Figure 3:
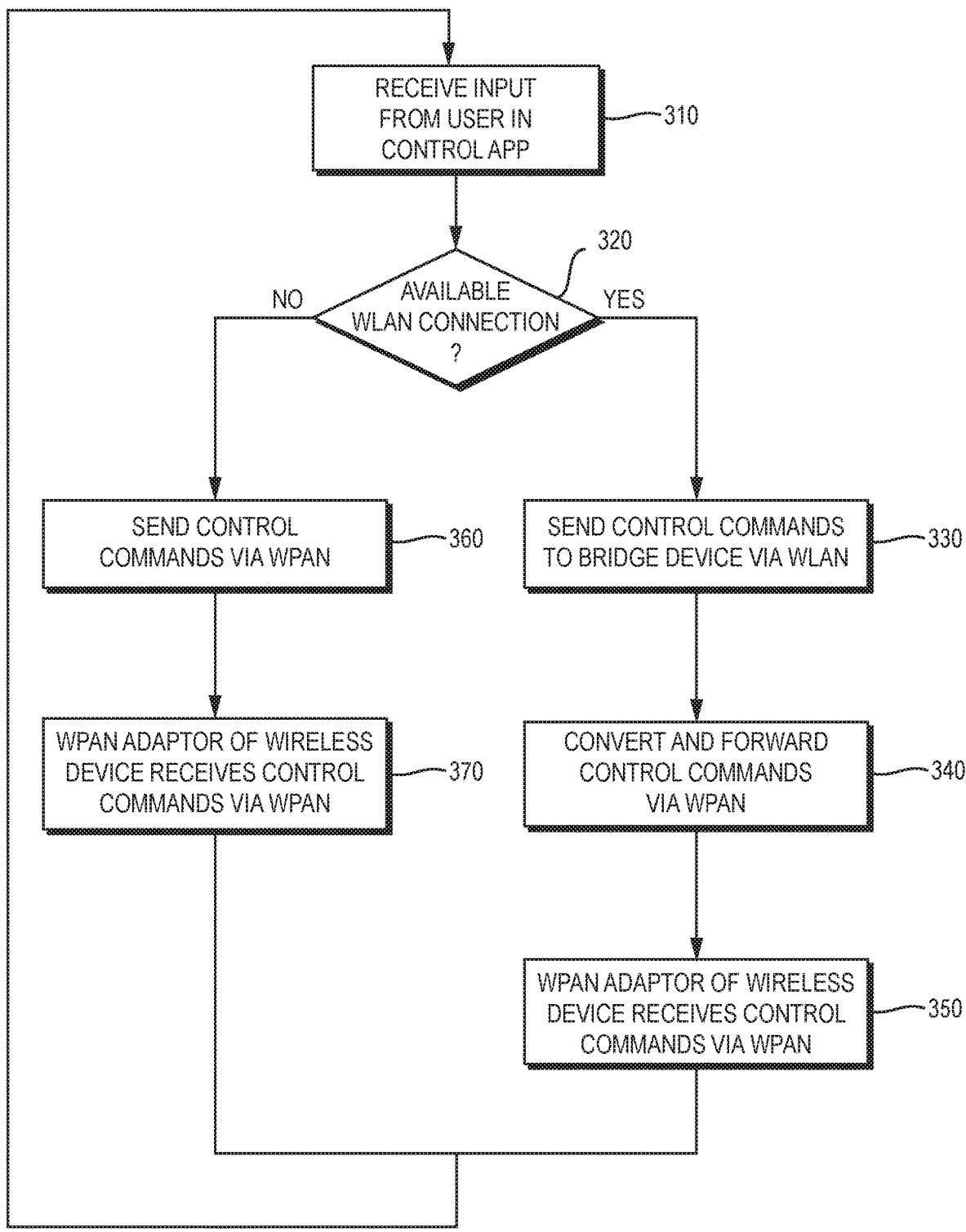
FIG. 3 is a flow diagram of an example sequence of steps for redundant control of wireless devices of a home automation system that uses a combination of WLAN and WPAN communication.

FIG. 3 is a flow diagram of an example sequence of steps for redundant control of wireless devices of a home automation system that uses a combination of WLAN and WPAN communication. At step 310, input is received from a user in a GUI of a control app executing on a control device (e.g., a remote control 150, mobile device 160, or other electronic device 170) requesting a state change to a wireless device (e.g., a wireless light fixture 129, wireless light strip 131, wireless window shade 141 or other wireless device 142). At step 320, the control app determines whether there is an available WLAN connection (e.g., Wi-Fi connection) to a bridge device (e.g., a lamp module 133 or wireless keypad 137) separate but proximate to the wireless device that may be used. If so, at step 330, the control app causes the control device to send control commands the bridge device (e.g., a lamp module 133 or wireless keypad 137) proximate the wireless device. At step 340, the bridge device (e.g., a lamp module 133 or wireless keypad 137) converts and forwards the control commands over a WPAN (e.g., BLE) to the wireless device. At step 350, a WPAN adaptor (e.g., BLE adaptor) of the wireless device receives the control commands and forwards them to appropriate circuitry that implements the desired state change (e.g., in a wireless window shade 141 to a motor control processor 250 that drives a motor 270). The system then waits and loops back to step 310 when additional input is received in the GUI from a user, and the steps repeat.

Returning to step 320, in the absence of an available WLAN (e.g., due to failure, prior to its configuration, etc.), execution proceeds to step 360, where the control app causes the control device to attempt to send control commands via the WPAN (e.g., BLE) directly to the wireless device. Provided the control device is proximate to the wireless device, such attempt should succeed. Assuming so, at step 370, a WPAN adaptor (e.g., BLE adaptor) of the wireless device receives the control commands and forwards them to appropriate circuitry that implements the desired state change (e.g., in a wireless window shade 141 to a motor control processor 250 that drives a motor 270). The system then waits and loops back to step 310 when additional input is received in the GUI from a user, and the steps repeat.

In summary, an architecture for redundant control of wireless devices of a home automation system is provided that uses a combination of WLAN and WPAN communication. While the above description uses certain specific examples, it should be apparent that a number of modifications and/or additions may be made thereto. For example, while it is discussed above that WPAN (e.g., BLE) communication to a wireless device (e.g., wireless light fixture 129, wireless light strip 131, wireless window shade 141 or other wireless device 142) may be used to provide redundancy in the absence of an available WLAN connection (e.g., Wi-Fi connection), for example, due to a failure, a WPAN may sometimes be used even if there is an available WLAN connection. For example, an installer may use a WPAN (e.g., BLE) between an installer control device (e.g., a mobile device or other electronic device operated by the installer) and a wireless device to configure settings (e.g., limits, speed, direction, etc.) during initial configuration. An end user of the system may later control the wireless device primarily by using their control device to transmit control commands via a WLAN (e.g., Wi-Fi) to a bridge device proximate the wireless device that are forwarded via a WPAN (e.g., BLE) to the wireless device. Likewise, the techniques may be used as an initial option as part of an expandable home automation system, even if there is an available WLAN connection (e.g., a Wi-Fi connection). For example, a home automation system may be initially configured to use a WPAN (e.g., BLE) between a control device and a wireless device. At a subsequent time, the home automation system 100 may be upgraded to add bridge devices (e.g., lamp modules 133 or wireless keypads 137) and potentially other devices (e.g., a host controller 110) and communication between the control device and the wireless device may be performed by transmission via a WLAN (e.g., Wi-Fi) to a bridge device proximate the wireless device and forwarding via a WPAN (e.g., BLE) to the wireless device.

Further, while the above description discusses BLE as an example of a WPAN protocol, it should be understood that the WPAN may use a wide variety of other protocols, for example ordinary Bluetooth, IrDA, Wireless USB, ZigBee, and other protocols.

Additionally, it should be understood that many the operations and steps described above may be implemented in hardware, software (embodied as a non-transitory electronic device-readable media including software), firmware, or a combination thereof. A non-transitory electronic device-readable media may take the form of a memory, such as a Random Access Memory (RAM), a disk, such as a hard drive or flash device, or other tangible storage media. In general, it should be understood that the above descriptions are meant to be taken only by way of example. What is claimed is:

The invention claimed is:

1. A method for control of a wireless light fixture or wireless window shade in a home automation system of a structure, comprising:
   receiving, by a control application (app) executing on a control device, input in a graphical user interface (GUI) requesting a state change to a wireless light fixture or wireless window shade, wherein the state change is to illuminate the wireless light fixture or open the wireless window shade;
   determining a Wi-Fi network has not yet been configured in the structure that can provide a Wi-Fi connection to a lamp module or keypad of the home automation system;
   in response to a Wi-Fi network having not yet been configured in the structure, sending control commands requesting the state change from the control device directly to the wireless light fixture or wireless window shade via Bluetooth Low Energy (BLE), to cause the wireless light fixture or wireless window shade to implement the state change;
   subsequent to the sending of control commands requesting the state change, receiving, by the control app executing on the control device, further input in the GUI requesting a further state change to the wireless light fixture or wireless window shade;
   determining the Wi-Fi network has now been configured in the structure; and
   in response to a Wi-Fi network having been configured in the structure, sending control commands requesting the further state change from the control device to the lamp module or keypad via the Wi-Fi connection, which converts and forwards the control commands over BLE to the wireless light fixture or wireless window shade to cause the wireless light fixture or wireless window shade to implement the further state change.

2. The method of claim 1, wherein the lamp module or keypad is a lamp module that controls power flow to one or more attached illumination sources, and the lamp module independent of bridging also performs a lighting device control function that includes regulating power flow to the one or more attached illumination sources.

3. The method of claim 1, wherein the lamp module or keypad is a keypad that provides a user interface, and the keypad independent of bridging also performs a user interface function that includes receiving user input requesting state changes and providing control commands in response thereto.

4. The method of claim 1, wherein the control device is a mobile device.

5. The method of claim 4, wherein the mobile device is a smartphone.

6. The method of claim 1, further comprising:
   subsequent to the sending of control commands requesting the further state change, receiving, by the control app executing on the control device, still further input in the GUI requesting a still further state change to the wireless light fixture or wireless window shade;
   determining the Wi-Fi network has failed after having been configured in the structure; and
   in response to a Wi-Fi network having failed after having been configured in the structure, again sending control commands requesting the still further state change from the control device directly to the wireless light fixture or wireless window shade via BLE, to cause the wireless light fixture or wireless window shade to implement the still further state change.

7. The method of claim 1, wherein the lamp module or keypad is separate but proximate to the wireless light fixture or wireless window shade.

8. A non-transitory electronic device readable medium having software stored thereon, the software when executed on one or more electronic devices being operable to:
   receive input in a graphical user interface (GUI) requesting a state change to a wireless light fixture or wireless window shade, wherein the state change is to illuminate the wireless light fixture or open the wireless window shade;
   determine a Wi-Fi network has not yet been configured in the structure that can provide a Wi-Fi connection to a lamp module or keypad of a home automation system;
   in response to a Wi-Fi network having not yet been configured in the structure, send control commands requesting the state change directly to the wireless light fixture or wireless window shade via Bluetooth Low Energy (BLE), to cause the wireless light fixture or wireless window shade to implement the state change;
   subsequent to the send of control commands requesting the state change, receive further input in the GUI requesting a further state change to the wireless light fixture or wireless window shade;
   determine the Wi-Fi network has now been configured in the structure; and
   in response to a Wi-Fi network having been configured in the structure, send control commands requesting the further state change to the lamp module or keypad via the Wi-Fi connection, which converts and forwards the control commands over BLE to the wireless light fixture or wireless window shade to cause the wireless light fixture or wireless window shade to implement the further state change.

9. The non-transitory electronic device readable medium of claim 8, wherein the lamp module or keypad is a lamp module that controls power flow to one or more attached illumination sources and the lamp module provides the lighting device control function that includes regulating power flow to the one or more attached illumination sources.

10. The non-transitory electronic device readable medium of claim 8, wherein the lamp module or keypad is a keypad that provides a user interface and the keypad provides the user interface function that includes receiving user input requesting state changes and providing control commands in response thereto.

11. The non-transitory electronic device readable medium of claim 8, wherein the one or more electronic devices include a mobile device.

12. The non-transitory electronic device readable medium of claim 11, wherein the mobile device is a smartphone.

13. The non-transitory electronic device readable medium of claim 8, wherein the software when executed is further operable to:
   subsequent to the send of control commands requesting the further state change, receive still further input in the GUI requesting a still further state change to the wireless light fixture or wireless window shade;
   determine the Wi-Fi network has failed after having been configured in the structure; and
   in response to a Wi-Fi network having failed after having been configured in the structure, again send control commands requesting the still further state change from the control device directly to the wireless light fixture or wireless window shade via BLE, to cause the wireless light fixture or wireless window shade to implement the still further state change.

14. The non-transitory electronic device readable medium of claim 8, wherein the lamp module or keypad is separate but proximate to the wireless light fixture or wireless window shade.

* * * * *

UNITED STATES PATENT AND TRADEMARK OFFICE
CERTIFICATE OF CORRECTION

| | | |
|---|---|---|
| PATENT NO. | : 11,936,492 B2 | Page 1 of 1 |
| APPLICATION NO. | : 17/018015 | |
| DATED | : March 19, 2024 | |
| INVENTOR(S) | : Robert P. Madonna et al. | |

It is certified that error appears in the above-identified patent and that said Letters Patent is hereby corrected as shown below:

In the Specification

Column 1, Line 29 reads:
"wired connections (e.g., Ethernet, RS-232, DMX/RS485,"
Should read:
--wired connections (e.g., Ethernet, RS-232, DMX/RS-485,--

Signed and Sealed this
Eighteenth Day of March, 2025

Coke Morgan Stewart
*Acting Director of the United States Patent and Trademark Office*